United States Patent [19]
Hold et al.

[11] 4,413,913
[45] Nov. 8, 1983

[54] METHOD FOR PROCESSING PLASTIC AND POLYMERIC MATERIALS

[75] Inventors: Peter Hold, Milford, Conn.; Zehev Tadmor, Teaneck, N.J.

[73] Assignee: USM Corporation, Farmington, Conn.

[21] Appl. No.: 361,397

[22] Filed: Mar. 24, 1982

Related U.S. Application Data

[60] Division of Ser. No. 190,465, Sep. 24, 1980, Pat. No. 4,329,065, which is a continuation of Ser. No. 971,331, Dec. 20, 1978, abandoned, which is a continuation-in-part of Ser. No. 849,184, Nov. 7, 1977, abandoned.

[51] Int. Cl.$^3$ .................. B01F 5/12; B01F 7/10; B29B 1/06; B29B 3/02
[52] U.S. Cl. .................. 366/75; 72/262; 366/76; 366/97; 366/99; 366/307; 366/315; 425/374; 425/466
[58] Field of Search .............. 366/52, 69, 97, 136, 366/262-265, 295, 302, 303-307, 315, 336-340; 425/224, 466, 374; 415/90, 101; 72/60, 262, 270

[56] References Cited

U.S. PATENT DOCUMENTS

| | | | |
|---|---|---|---|
| 4,142,805 | 3/1979 | Tadmor | 366/97 |
| 4,194,841 | 3/1980 | Tadmor | 366/75 |
| 4,255,059 | 3/1981 | Hold et al. | 366/97 |

*Primary Examiner*—Timothy F. Simone
*Attorney, Agent, or Firm*—John P. Morley; Frances J. P. Craig

[57] ABSTRACT

Novel and improved methods and apparatus for processing liquid or viscous materials. Essentially, the methods and apparatus involve feeding liquid materials to an annular processing passage for controlled processing. The annular processing passage is provided by two elements. One is a rotatable element carrying at least one processing channel. The other element is stationary and provides a complementary coaxial surface arranged with the channel to provide the enclosed processing passage. Also associated with the stationary element are an inlet for feeding material to the passage, an outlet for discharging material from the passage, an element near the outlet providing a material collecting end wall surface and an element positioned between the inlet and outlet providing a liquid material spreading surface. Rotation of the rotatable element toward the spreading surface provides a coaction between the rotatable element and the spreading surface so that relative movement is established between the rotating inner channel walls and liquid material between the inlet and the spreader surface. Because of the relative movement, the liquid material is spread toward the walls and dragged by the walls through a clearance between the sides of the spreading surface providing member and the side walls as thin layers providing central spaces of the passage downstream of the spreader surface which are free of liquid material. Means are arranged for communicating with the free central spaces to add materials to or withdraw materials from the free central space.

10 Claims, 12 Drawing Figures

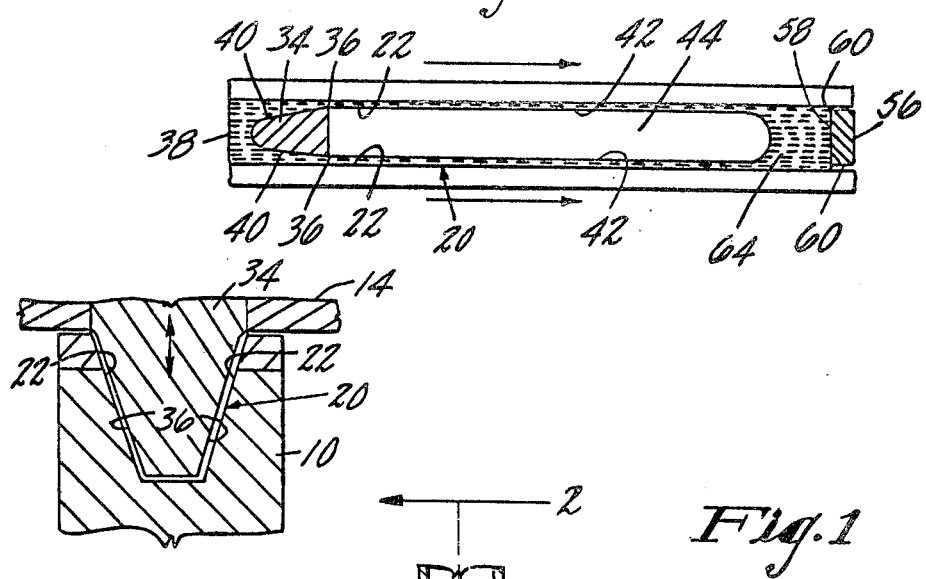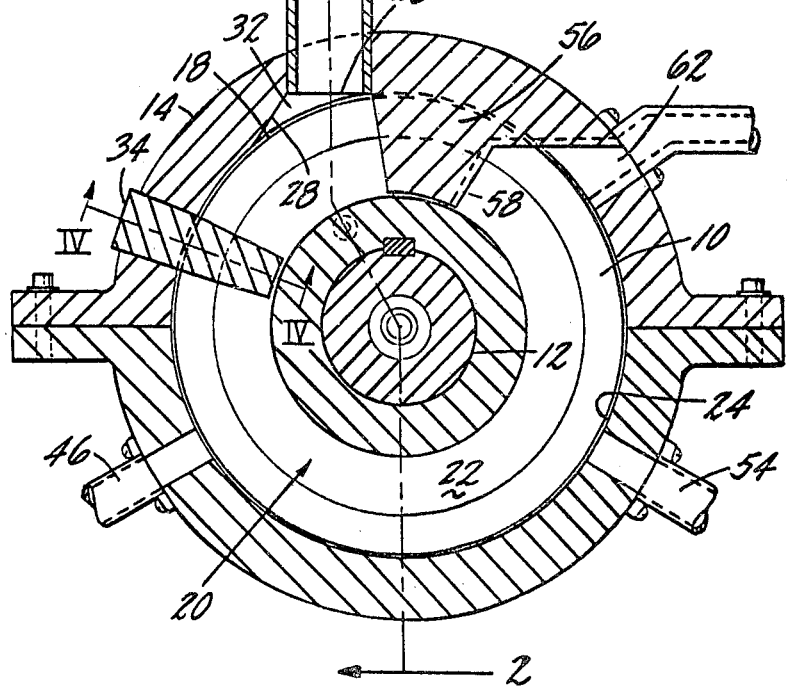

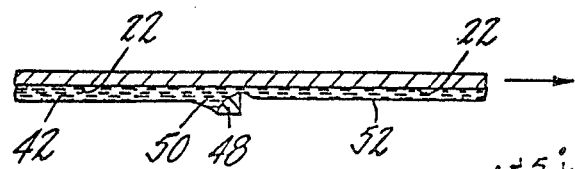
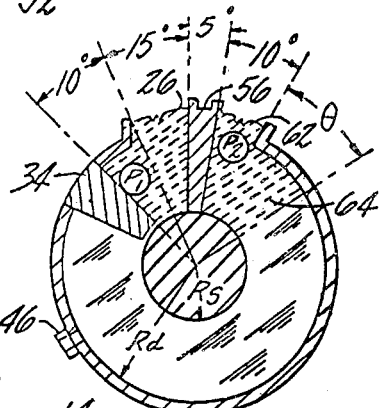
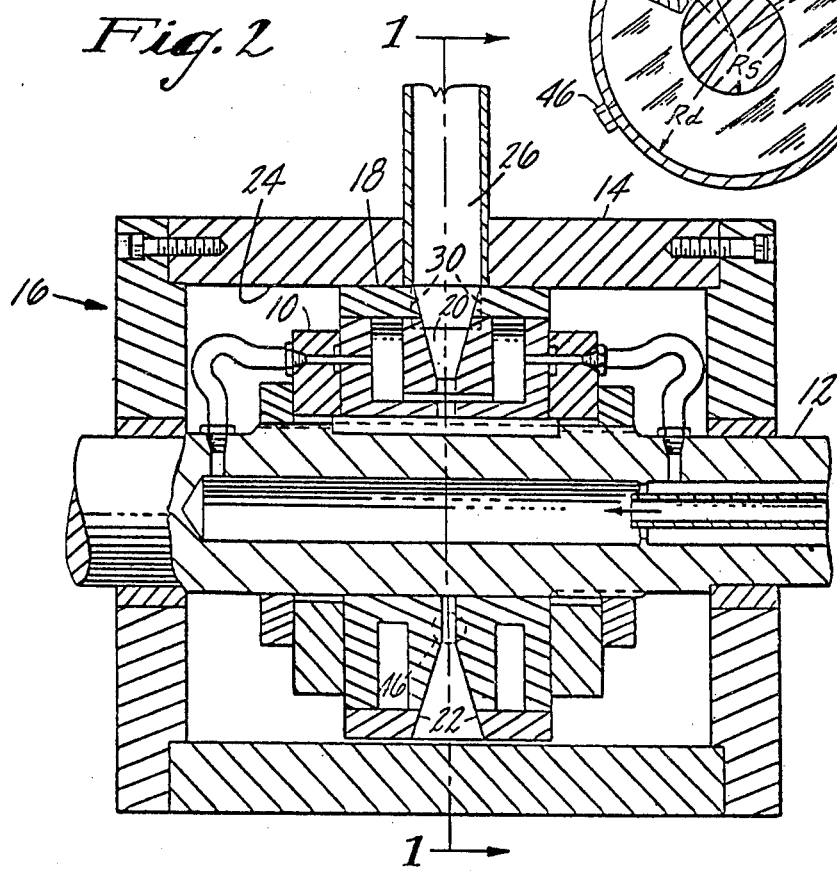

METHOD FOR PROCESSING PLASTIC AND POLYMERIC MATERIALS

CROSS REFERENCE TO RELATED APPLICATIONS

This application is a divisional of U.S. application Ser. No. 190,465 filed Sept. 24, 1980, U.S. Pat. No. 4,329,065, by Peter Hold et al which is a continuation of application Ser. No. 971,331 filed Dec. 20, 1978, abandoned by Peter Hold et al which in turn was a continuation-in-part of U.S. application Ser. No. 849,184 filed Nov. 7, 1977, by Peter Hold et al and which is now abandoned.

THE FIELD OF THE INVENTION

This invention relates to apparatus and methods for processing liquids and particularly for processing viscous liquid plastic or polymeric materials.

DESCRIPTION OF THE PRIOR ART

U.S. Pat. Nos. 4,142,805 and 4,194,841 issued to Zehev Tadmor-one of the inventors of this Application-disclose processes and apparatus for processing plastic or polymeric materials. U.S. Pat. Nos. 4,142,805 and 4,194,841 are expressly incorporated here by reference.

The essential elements of the basic, individual, annular processing passage described in those Applications comprise a rotatable element carrying at least one annular processing channel and a stationary element providing a coaxial surface cooperative with the channel to form an enclosed processing passage. The stationary element has an inlet to feed material to the passage for processing and an outlet spaced apart from the inlet a major portion of the circumferential distance about the processing passage to discharge processed material from the passage. A member providing a material collecting end wall surface is arranged with the stationary element and located in the passage near the outlet to obstruct or restrain movement of material fed to the passage and to coact with the rotating channel walls to provide relative movement between the material and the internal surfaces of the channel walls rotated toward the outlet. This distinctive coaction permits only liquid material in contact with the internal surfaces of the rotating channel to be dragged forward to the liquid material collecting end wall surface for controlled processing and/or discharge.

In the preferred embodiment of the invention described in U.S. Pat. Nos. 4,142,805 and 4,194,841, the essential elements of the processing apparatus are arranged so that the rotatable channel carrying element is adapted for rotation in a stationary housing or chamber (the stationary element). The described processing channel and preferably a plurality of processing channels are formed in the cylindrical surface of a rotor each channel having opposing side walls extending inwardly from the rotor surface. The stationary housing or chamber described has an internal, cylindrical surface providing the cooperative coaxial surface which together with the annular processing channel(s) form an enclosed processing passage(s).

The method and apparatus of the Tadmor Applications are described as useful for conveying of solids, melting or plasticating plastic or polymeric material; conveying, pumping or pressurizing viscous liquid material; mixing, blending, dispersing and homogenizing material, and devolatilizing and/or bringing about molecular or microscopic or macroscopic structural changes by chemical reactions such as polymerization.

U.S. Pat. Nos. 4,142,805 and 4,194,841 also disclose methods and apparatus having processing passages provided with mixing structures extending part way into the channels and positioned between the inlet and outlet of the passage. One mixing structure particularly described is a dam which creates a void of material on its forward face, e.g. the face of the mixing structure closest to the outlet. A port can be connected to the void to allow any materials volatilized to escape or, the port can be used as an inlet for adding materials to the void.

While some removal of volatilized material can be obtained by the methods and apparatus disclosed in referenced U.S. Pat. Nos. 4,142,805 and 4,194,841, the surface area provided by the void is small so that the devolatilization efficiency is relatively low. This invention presents improved processing apparatus providing an especially efficient volume to surface area ratio for a devolatilization passage(s) thereby improving the overall transfer efficiency of materials to or from viscous materials processed in such passages.

SUMMARY OF THE INVENTION

The present invention provides improvements in the processes and apparatus disclosed in referenced U.S. Pat. Nos. 4,142,805 and 4,194,841 for processing liquid or particulate plastic and polymeric materials which in the course of processing become liquid materials. Essentially, this invention presents processes and apparatus in which a body of plastic or polymeric materials is fed into an annular processing channel for controlled processing. The annular processing passage is provided by two elements. One element is a rotatable element having a surface of rotation coaxial with the rotatable element and carrying at least one processing channel formed by opposing walls extending inwardly from the surface. The other element is a stationary element providing a coaxial surface which together with the surface carrying the channel(s) form the annular processing passage(s). Additionally, the stationary element has associated with it, an inlet for feeding particulate material to the passage and an outlet spaced apart from the inlet by a major portion of the circumferential distance about the passage for discharging melted material from the passage. Also associated with the stationary element is a member located near the outlet and extending into the channel and providing a material collecting end wall surface.

In accordance with the practice of this invention, a member providing a liquid or viscous material spreading surface is positioned in the passage between the inlet and outlet and extends into the processing channel. The liquid or viscous material spreading surface is designed to spread liquid material toward the channel walls and to provide a clearance between the sides of the member providing the liquid material spreading surface and the inner wall surfaces of the channel. As the rotatable element is rotated, a dragging action is established between the rotating inner wall surface and the liquid material between the inlet and the spreader surface so that the liquid material is spread on the rotating inner surfaces and dragged through the clearance as thin layers and beyond the spreader to be collected as a pool and discharged through the outlet. Because the liquid material is distributed as thin layers on the rotating surfaces, a central space of the passage downstream of the spreader free of material is provided. A port is connected to the central space to pass material to or from the free central space. The invention therefore provides a particularly efficient surface area to volume ratio for a processing passage which markedly improves the overall transfer efficiency of material(s) to or from the thin layers of viscous material distributed on and carried by the rotating walls.

DESCRIPTION OF THE DRAWINGS

FIG. 1 is a sectional elevational view of a processing machine according to the present invention taken on the line 1—1 of FIG. 2, perpendicular to the axis of rotation of the rotor of the processing machine;

FIG. 2 is a sectional elevational view of the processing machine of FIG. 1 taken along the line 2—2 of FIG. 1 parallel to the axis of the rotation of the rotor;

FIG. 3 is a flattened sectional view of a channel of the rotor taken along a selected radius and illustrating the movement of material within the channel;

FIG. 4 is a sectional fractional elevational view taken along the line 4—4 of FIG. 1 in the direction of the arrows and showing the relation of the liquid spreading surface providing member to the walls of the channel;

FIG. 5 is a flattened fractional sectional view of one side of a channel taken along a selected radius and illustrating the action of a mixing element on the layer of material carried on a channel wall;

FIG. 7 is a diagrammatic sectional elevational view of a rotary processor showing the angular relation of members of the processing machine.

FIG. 10 is a sectional view of a rotary processor shown in FIG. 9 viewed along lines 10—10.

DESCRIPTION OF THE PREFERRED EMBODIMENT

Figure 6:
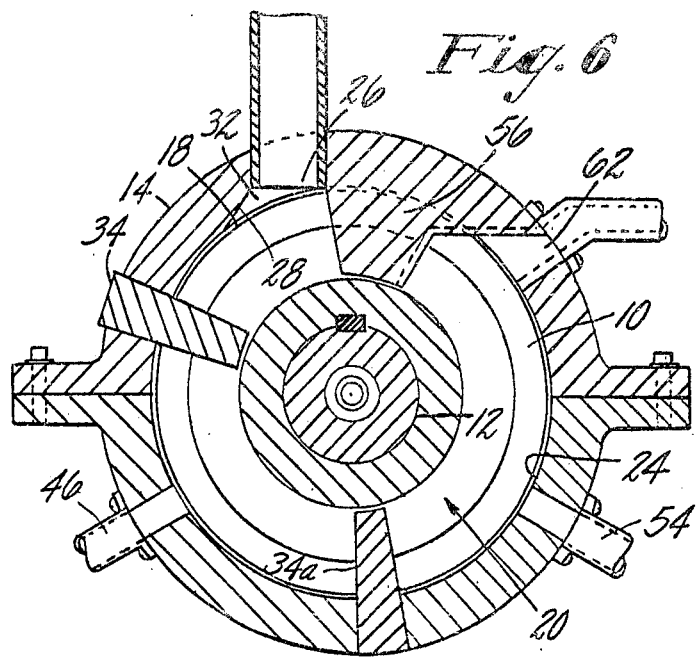

The method and apparatus of the present invention give the unique advantage that viscous liquid plastic or polymeric material is processed by feeding a body of the material through an inlet to the space between two opposed surfaces forming part of an enclosed passage, spreading the material in a thin layer on the surfaces, with central portions of the space between the layers kept free so that a large surface area to volume ratio is secured for especially effective material transfer between the viscous liquid plastic or polymeric material. The free central space provided between the layers on the channel walls is available to accept or supply gaseous or volatile substances from or to the layers or to allow introduction of solid or liquid materials to the layers. Moving both surfaces simultaneously in a direction conveys the material in the channel toward the outlet for collection in a pool against a material collecting end wall surface for discharge through an outlet from the channel.

Apparatus effective to provide this action (see FIGS. 1 and 2) includes a rotatable element comprising a rotor 10 mounted on a drive shaft 12 for rotation within a stationary element comprising a housing 14, with shaft 12 journalled in end plates 18 of housing 14. Rotor 10 has a surface 18 which is a surface of rotation coaxial with rotor 10 preferably cylindrical as shown and carrying at least one processing channel 20 formed by opposing side walls 22 extending inwardly from surface 18. The channel is shown as having a wedge-shaped cross-section with its greatest width outward for ease in feeding, uniform processing and for coaction with liquid spreading surface providing member 34. The channel, however, can have other cross-sectional shapes with spreader 34 having a complementary shape without departing from the scope of the invention. Housing 14 provides surface 24 complementary to, coaxial with and cooperatively arranged with surface 18 of rotor 10 to form with channel(s) 20, enclosed annular passages.

An inlet opening 26 through housing 14 is provided for introduction of plastic or polymeric material for processing from a suitable feeder, into annular channel(s) 20. It will be understood that suitable plastic or polymeric feeding devices will be used which may be a screw feeder, a ram feeder, a disc-type pre-heater feed and so on, depending on the character of the plastic or polymeric material and the difficulty of controlling its supply to channel 20.

As shown more clearly in FIG. 1, interior surface 24 of housing 14 is cylindrical over most of its extent but is provided with an undercut 28 adjacent material inlet opening 26 to channel 20. This undercut 28 is of a width such that its walls 30 extend out over the cylindrical portions 18 of rotor 10 to form an intake chamber 32 so that when viscous liquid material is supplied through inlet opening 26, the viscous liquid material is dragged by cylindrical surface 18 of the rotor to the nip where the surface of walls 30 of undercut 28 approaches cylindrical surface 18 of the rotor. This action facilitates squeezing of the viscous material into channel 20.

An outlet opening 62 through housing 14 is disposed at least a major portion of a complete revolution of rotor 12 from inlet opening 26 in a position to receive and discharge processed material reaching surface 58 of channel block 58. Control of the rate at which processed material is allowed to discharge from the channel is an important factor in determining the extent to which the material is processed and outlet 62 is constructed and arranged to provide this discharge control. Control may be effected by the size of the opening or by a throttling valve or other device in the discharge outlet. The discharge rate may also be controlled by connecting outlet opening 62 to a further processing stage such as an extrusion nozzle or die (not shown) or the like which may provide desired flow resistance controlling the rate of discharge from the outlet and the extent of processing of material in the channel. In a modification, in apparatus of the present invention having more than one channel, the outlet from one channel may be lead through a conduit to the inlet of a further channel for further processing. This arrangement is particularly valuable since the series pressure-producing and pumping action of successive processing channels is cumulative so that high outlet pressure is readily secured. It will be understood that successive channels may each have different geometry from other channels for best processing of material supplied to it. Also, material processed in and discharged from one channel or a given number of channels operating in parallel may be fed to one channel or to any suitable number of channels operating in parallel.

Apparatus of this invention includes at least one liquid spreading surface providing member (spreader 34) (See FIGS. 1, 3 and 4) shown as member shaped complementary to the cross-sectional shape of the channel extending through housing 14 into channel 20. Spreader 34 may be movable in and out of the channel to vary the clearance between sides 36 of spreader 34 and channel walls 22. Alternatively, spreader 34 can be shaped and adapted for rotation in the channel so that clearance between sides 36 and walls 22 can be varied by rotation of spreader 34. Obviously, the cross-sectional shape of the channel and spreader 34 can vary without departing from the scope of the invention in the form shown. Spreader 34 extends towards the inlet to provide a rounded radially disposed surface 38 and side surfaces 40, diverging from surface 38 to the sides 36 to spread the material being processed on side walls 22 of channel 20. Spreader 34 shown in FIG. 1 is located as close to inlet 26 as will allow development of pressure by the action on channel side walls 22 dragging forward the viscous material to an extent sufficient to spread the material over surface 38 of spreader 34 and to drag the material through the clearance between sides 36 of spreader 34 and channel walls 22 to spread it as thin layers 42 which are carried forward on the walls. However, spreader 34 could be located farther along the channel if appropriate to the material being processed. Central portions 44 of channel 20 forward of spreader 34 in the direction of the movement of channel 20 are kept free of plastic or polymeric material by spreader 34 so that the thin layers 42 (FIG. 3) have free surfaces exposed to free central space 44 for transfer of substances between space 44 and layers 42. For example, volatiles in the plastic or polymeric material may pass into the free space and be withdrawn through an exit port 48 from the channel, with the aid of vacuum if desired, to effect devolatilization. Because of the high ratio of surface area to volume provided by this invention and the short distance which materials must travel through layers 42 to reach the free surfaces, the transfer action such as devolatilization (or stripping) is especially efficient.

Mixing of the material of layers 42 on the channel walls to aid the devolatilization or other transfer of material between central free space 44 and the material of layers 42 may be effected by disposing mixing elements 48 (See FIG. 5) to engage layers 42 conveyed by channel walls 22. Mixing element 40 shown in FIG. 5 is a bar or knife spreader, parallel to and spaced from channel walls 22, a distance somewhat less than the thickness of layers 42 effective to collect a bank of matrial of the layer before it to effect mixing in bank 50 and to spread the material from bank 50 as a layer 52 on the surface of channel walls 22 moving past it. Other mixing devices such as pins, rods and so on which may be movable in and out of the channel and/or rotatable in the channel may of course be used.

A particularly preferred alternate arrangement of elements for mixing materials of layers 42 on the channel walls is illustrated in FIG. 6. As illustrated there, a second spreader 34a is shown positioned in channel 20 intermediate first spreader 34 and outlet 62 so that the material is sequentially spread and mixed as it is carried through the channel. Second spreader 34a can be of the same form and shape as first spreader 34 shown in FIGS. 1 and 4 and second spreader 34a will spread viscous liquid material carried toward it by channel walls 22 as thin layers 42 which are then carried forward to channel block 56. Also, like spreader 34, central portions of channel 20 forward of spreader 34a in the direction of rotation of walls 22 are kept free of viscous liquid material. Accordingly, the thin layers spread on walls 22 by second spreader 34a have free surfaces exposed to a second central free space (not shown) forward of second spreader 34a. Therefore, substances may be transferred between the thin layers spread on the walls by second spreader 34a and the second free central space forward of second spreader 34a. For example, port 54 (FIG. 6) may be used to introduce or withdraw materials to or from the central free space forward of second spreader 34a.

One of the special advantages obtained by using more than one spreader is that the sequential spreading and mixing of material carried along by the channel walls provides especially efficient diffusion controlled mass transfer. Devolatilization processes involving sequential spreading and mixing as can be achieved by the practice of this invention is vastly different from known devolatilization processes performed in screw extruders. In such known processes, partially devolatilized material is usually mixed with or returned to material having a high concentration of volatiles. However, in this embodiment of the invention, a plurality of separated free spaces are provided along the passage (or along a plurality of interconnected passages) and the concentration of volatiles can be progressively reduced as the material is dragged through successive separated free spaced. These free spaces can also be used to transfer the same or different materials to or from the provided plurality of free spaces.

Inlet port 54, as shown in FIGS. 1 and 6, may also be provided for introduction of materials to free space 44 between layers 42 of plastic or polymeric material on walls 22 of the channel. Material introduced through inlet port 54 may be a gas to provide an improved flow and sweeping action relative to the layers of materials to aid in removal of gases or vapors discharged from the surface or may be a reagent for combination with the material of the layers or a reinforcing material such as glass beads or reinforcing fibers or pigments or other solids for incorporation in the plastic or polymeric material.

Channel block 58 (FIGS. 1 and 8) mounted on housing 14 extends into channel 20 at a circumferential position at least a major portion of a complete revolution of rotor 10 from inlet 26 to provide an end wall 58 for channel 20 and scraper portions 60 (FIG. 3) in close relation to walls 22 of the channel. Channel block 56 has a shape complementary to and fitting closely within channel 20 into which it extends and end wall 58 facing channel 20 may be radially disposed or at another suitable angle depending upon the material and treatment desired. Adjacent to channel block 58, upstream from it, i.e. counter to the direction of movement of the channel, an outlet opening 62 is provided through housing 14.

Channel block 56 scrapes off and collects viscous liquid material carried forward by side walls 22 of channel 20 and this material accumulates as a pool 64 (FIG. 3) against end wall 58 of the channel block and is discharged from channel 20 by the pressure built up in the pool. As shown in FIG. 3, the size of pool 64 is controlled to leave the major portion of central space 44 of the channel free for transfer of material to and from layers 42 on channel walls 22. The size of pool 64 is maintained by controlling the rate at which material passes spreader 34 as films or layers 42 on channel walls 22 relative to the rate of discharge of material from the outlet opening 62 following the principles laid down in the above referred to Applications of Tadmor. In general, the pool 64 will be kept at a size close to the minimum required to generate enough pressure by the pumping action of the channel walls 22 on the material of the pool 64 to effect discharge of the material from the outlet opening 62.

As discussed more fully in the earlier Applications of Tadmor above referred to, the inter-relationship of rate of feed and discharge of liquid viscous plastic and polymeric materials to an annular processing channel and the speed of the channel walls, with respect to the properties of the selected material, the temperature and the geometry of the channel, assuming: isothermal, laminar, steady, fully developed flow of an incompressible power law model non-Newtonian fluid, neglecting gravitational and inertial (centrifugal) forces is expressed by the following equation for wedged shaped channels:

$$Q = \tfrac{3}{8}\pi N H_d R_d^2 (1 - \alpha^3) - \frac{H_d^{2+s} R_d^{1-s} (1 - \alpha^3) \frac{(dP)^s}{(d\theta)}}{6(s + 2) 2^s m^s}$$

In the above equation:
Q = volumetric flow rate (in³/sec.)
N = frequency of channel rotation (r.p.s.)
$R_d$ = outside radius of annular channel (in.)
$R_s$ = inside radius of annular channel (in.)
$\alpha = R_s/R_d$
$H_d$ = width of annular channel at $R = R_d$
P = pressure (psi)
$\theta$ = angle (radians)
$dP/d\theta$ = angular pressure gradient (psi/rad.)
s = 1/n empirical parameter of the 'power-law' model fluid:

$$\eta = M\dot\gamma^{n-1}$$

$\eta$ = non-Newtonian viscosity (lb/sec/in²)
m = empirical parameter (lb/sec$^n$/in²)
n = empirical parameter
$\gamma$ = shear rate, (1/sec)

In the above equation the first term on the right-hand side is the 'drag flow' and the second term is the 'pressure' flow. This equation also applies for Newtonian fluids in which s = n = 1 and m = $\mu$ is the Newtonian viscosity.

Operating conditions and physical set up for a machine according to the present invention for treatment of viscous plastic material at a given rate with development of desired pressure at the outlet opening are determined by first calculating for each of a series of disc speeds N, the spacing of the sides of the spreader from the walls of the channel for each speed which would be needed to form a film or layer having thickness which will deliver the viscous material at the desired rate. A preferred range of thicknesses of the films or layers on the walls of the channel is from 0.001 to 0.100 in. This thickness is calculated from the equation:

$$Q = 2\pi N \delta R_d^2 (1 - \alpha^2)$$

where Q is the volumetric flow rate (in³/sec.), $\alpha$ is the ratio $R_s/R_d$ of inside radius of annular channel $R_s$ (in.), to outside radius of annular channel $R_d$ (in.), $\delta$ is the film thickness (in.), N is the frequency of channel rotation (r.p.s.).

From the calculation of combinations of N and $\delta$ effective to deliver material at a desired rate and pressure for spreading on the channel walls by the spreader, determination of the angular extent of the melt pool to give the desired discharge pressure at each value of N is determined from the equation of the Tadmor Applications set foth above. Ordinarily a combination of film thickness $\delta$ and channel rotor speed N will be chosen so that a major portion of the channel between the spreader and the face of the melt pool is kept open for best transfer of material between free space in the channel and the film or layer of the material on the channel walls.

Figure 8:
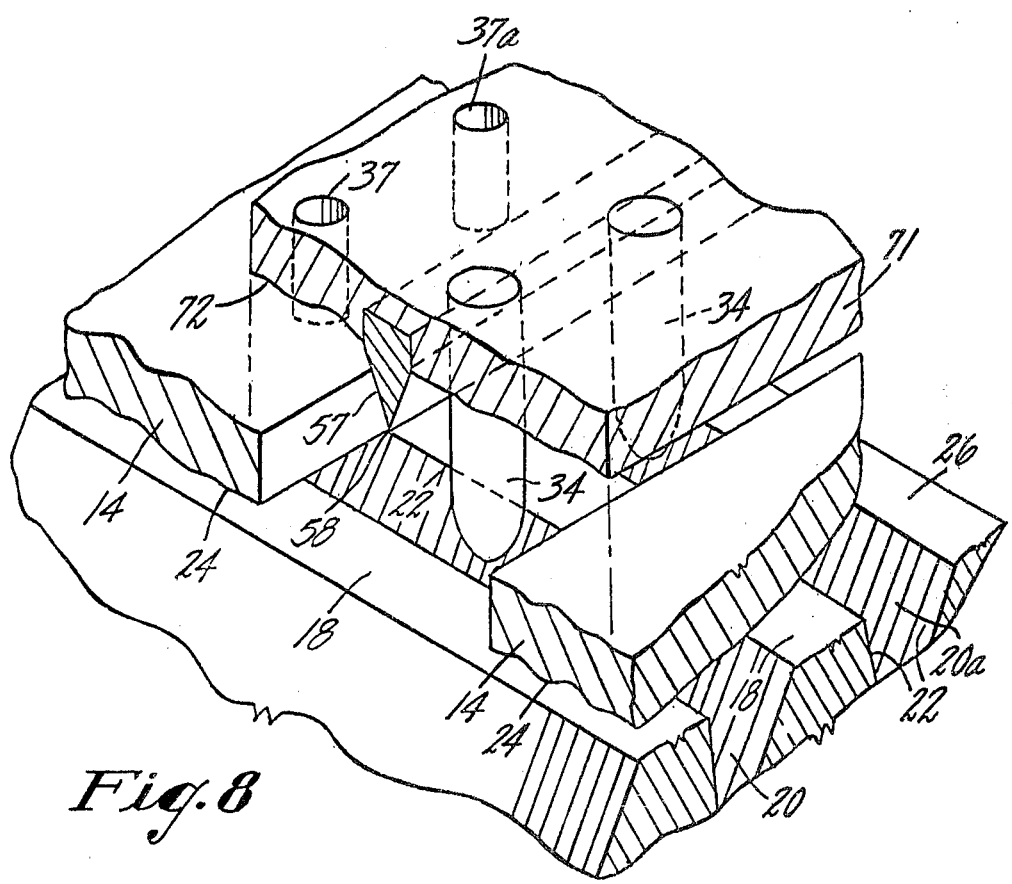
FIG. 8 illustrates an embodiment of this invention and is a perspective view of a rotary processor which is partly in section and showing a multi spreader element in exploded relation to the remainder of the processor members to show the various parts.
Figure 9:
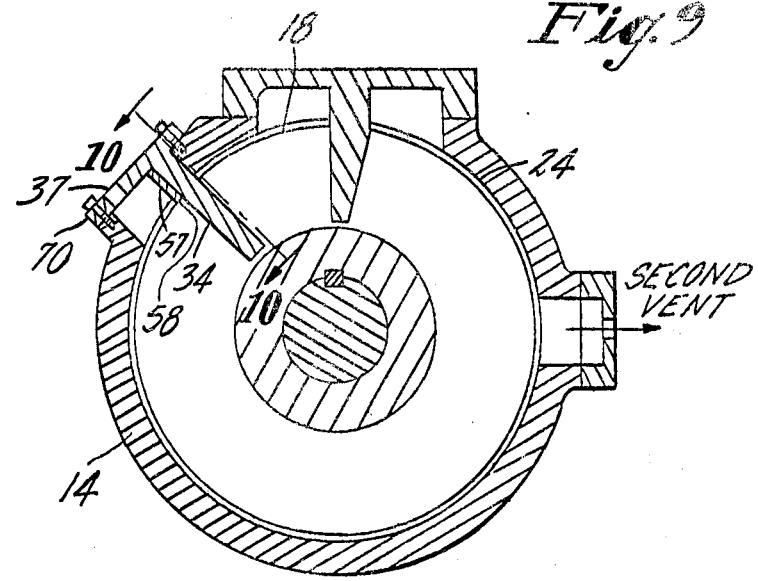
FIG. 9 is a sectional view of a rotary processor passage of this invention.
Figure 10:
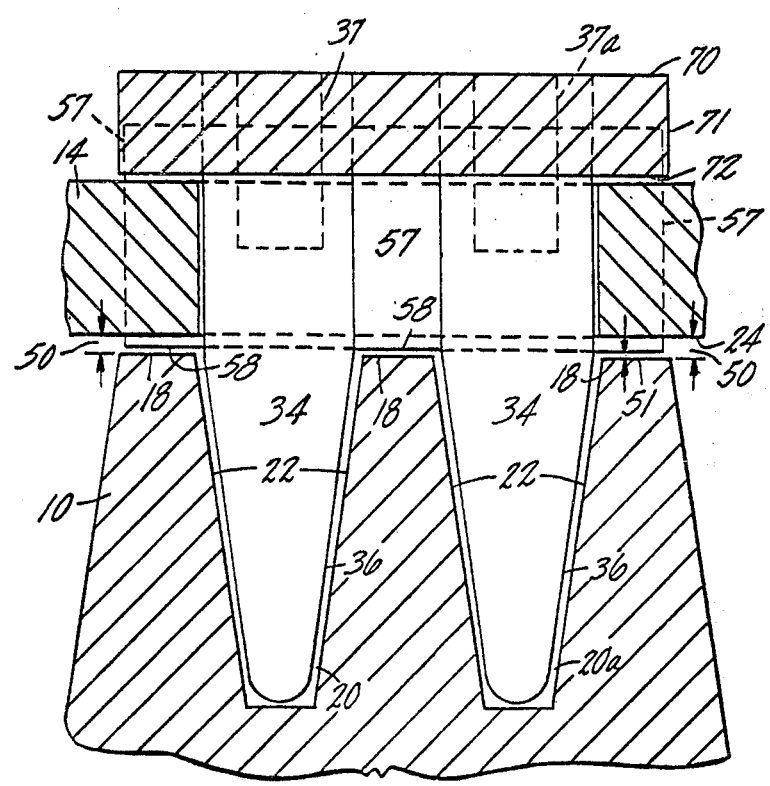
FIG. 10 is a sectional elevation view of a rotary processor similar to that shown in FIG. 1 and illustrating an alternative embodiment of the invention.

FIGS. 8, 9 and 10 illustrate embodiments of this invention providing certain structural advantages for rotary processors of this invention as well as improved overall operational characteristics of such rotary processors. FIGS. 8, 9 and 10 show a multi-channel rotary processor having adjacent devolatilizing channels 20 and 20a which can be arranged for series or parallel operation and are separated by top surface 18 of rotor 10. A multi-spreader positioning element 70 has a base member 71 carrying a plurality of spreaders 34 which are the essential structural members of positioning element 70 and—if desired—can be the only structural members carried by positioning element 70. As shown, spreaders 34 are securedly fixed in base member 71 and project from surface 72 so that the attachment of the base member on housing 14 positions each spreader in operational position in channels 20 and 20a respectively. Surface 72 of base member 71 may be contoured, shaped or otherwise dimensioned so that positioning element 70 is adapted for secure—but preferably removable—attachment to adjacent surface portions of housing 14.

As shown in FIGS. 8, 9 and 10, multi-spreader positioning element 70 is used to position spreaders 34 in adjacent devolatizing passages. However, it should be understood that multi-spreader positioning elements 70 can also be used to position spreaders in selected nonadjacent devolatilizing passages separated by one or more channels of a rotary processor.

As already described, spreaders 34 spread viscous liquid material moving along channels 20 and 20a interconnected in series as thinlayers 42 (FIG. 3) on channel walls 22. This spreading provides a free central space 44 (FIG. 3) in each devolatilizing channel(s) 20 and 20a for transfer of substances between free space 44 and layers 42. Accordingly, the unitary multi-spreader positioning element 70 can also include a plurality of ports 37 and 37a positioned forward of spreaders 34 in the direction of rotation of channels 20 and 20a respectively. When so positioned, ports 37 and 37a may be arranged in operational communication with free space(s) 44 to provide outlet ports to withdraw volatiles transferred from layers 42 to free space 44 with the aid of vacuum to effect devolatilization. Alternatively, ports 37 and 37a can be used as inlet ports to introduce gaseous or solid material to free space 44, for example, for mixture with the material of layers 42. The shape of ports 37 and 37a is not especially critical. They can be rectangular, circular, semi-circular, triangular etc. and the manners for connecting suitable means to the ports so that the ports can function as inlet or outlet ports are known to those in the art.

Unitary multi-spreader positioning element 70 can also include integral scraping means 57 fixed in base member 71 and projecting from surface 72 of multi-spreader positioning element 70. Scraping means 57 is preferably positioned forward of spreaders 34a in the direction of rotation of channel walls 22. When—as shown in FIGS. 8, 9 and 10,—unitary multi-scraper positioning elements 70 also have ports 37 and 37a, scraping means 57 is preferably positioned between spreaders 34a and ports 37 and 37a. Scraping means 57 is dimensioned and arranged to provide a close scraping relationship between scraping edge 58 and the circumferential surface portions 18 of the rotor adjacent the channel wall(s) 22. The function of scraping means 57 is to scrape off viscous material which may accumulate on surface 18 during each revolution of channel walls 22. The integration of scraping means 57 with positioning member 70 is particularly preferred if multi-spreader positioning element 70 is positioned at or near inlet portions of the passages so that scraped off material is discharged into the inlet area.

Scraping off of accumulated material is essentially designed to prevent undesirable stagnation and degradation of accumulated viscous material on surface 18. Also, stagnated viscous material accumulated on surface 18 can increase drag flow between surfaces 18 and 24 thereby causing an unwanted power loss. By continuously scraping accumulated material from surface 18 the quality of material processed and the overall efficiency of the rotary processor is improved.

Figure 11:
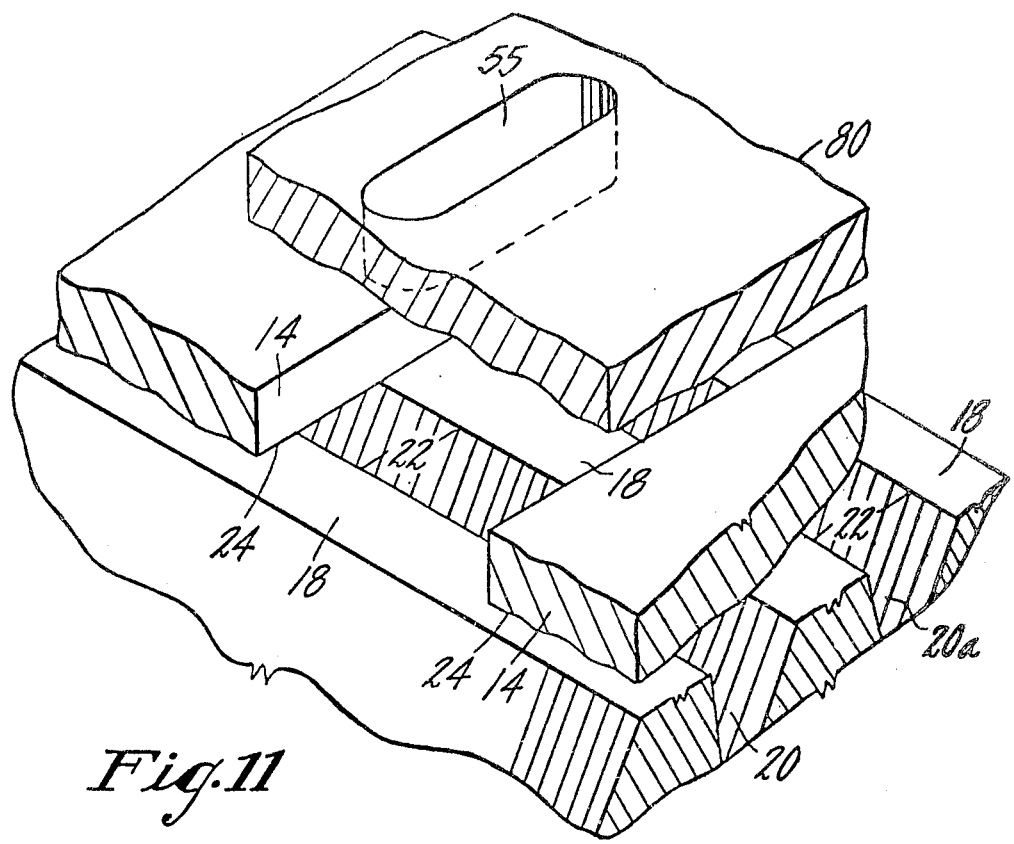
FIG. 11 illustrates still another embodiment of this invention and is a perspective view of a rotary processor which is partly in section and with a multi part positioning element in exploded relation to the remainder of the processor members to show the various parts.

FIG. 11 illustrates another embodiment of this invention providing certain structural and operational advantages for rotary processors of this invention. FIG. 11 shows a multi-channel rotary processor having adjacent devolatilizing channels 20 and 20a separated by top surface 18. Element 80 is attached to housing 14 and is provided with a single port 55 which can communicate with free space(s) 44 (FIG. 3) of channels 20 and 20a respectively. In accordance with the discussion of FIGS. 8, 9 and 10, port 55 of element 80 can also function as a common inlet or outlet port. Also, it should be understood that port 55 of element 80—or ports 37 and 37a of element 70 also—can provide the same or different functions. For example, all of the ports can be used as inlets (or outlets) or some can be used as inlet ports and others can be used as outlet ports.

Figure 12:
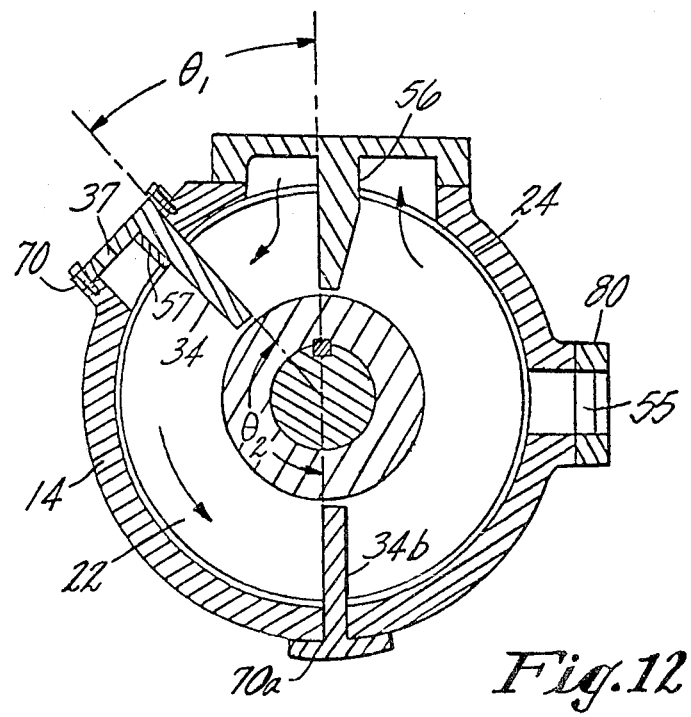
FIG. 12 is a cross-sectional view of a devolatilizing channel of this invention illustrating an alternative embodiment of the invention.

The operational and structural advantages obtained by using the embodiments illustrated in FIGS. 8–11 will be better appreciated by reference to FIG. 12 in which the multi-spreader positioning element 70 carrying spreader 34 and scraping means 57 and providing port 37 is positioned near the inlet of a devolatilizing channel. In this arrangement port 37 of element 70 can be used as an inlet or an outlet communicating with the free space 44 (FIG. 3) created behind spreader 34 carried by element 70. Another element 70a is spaced apart from element 70 about half way around the devolatilization channel. Element 70a is similar to element 70 in that it is a multi-spreader positioning element, but as shown, does not include a scraping means 57 or a port 37. Instead, element 80 provides a port 55 which functions as an inlet or outlet communicating with the free space provided by spreader 34b of element 70a.

As an illustration of suitable dimensions for a passage of this invention and designed as shown in FIG. 12, the value of angle $\theta_1$ may be between about 5° to about 15°, the value of angle $\theta_2$ may be between about 90° to about 180°. A channel of FIG. 12 can be rotated at speeds between about 10 RPM to about 100 RPM and preferred speeds of rotation are between about 30 RPM to about 60 RPM.

As mentioned, multi-spreader positioning element 70 (and 70a) and multi-port positioning element 80 are securely but removably attached to housing 14. Accordingly, the arrangement and positioning of elements 70, 70a or 80 can be interchanged to provide predetermined devolatilization and/or mixing capabilities for various processing channels which can be arranged in parallel operation or arranged for operation in series. Alternatively, the overall versatility of the rotary processing apparatus is improved because some or all of the elements 70, 70a and 80 can be removed and replaced by plugs shaped and dimensioned to provie an uninterrupted enclosed annular channel where elements 70, 70a or 80 had been positioned for performance of functions other than devolatilization Materials which may be processed by the method and apparatus of the present invention include all plastic materials and polymeric materials normally liquid or reducible by heat or mechanical energy, or by diluent to viscous liquid state for processing and which have sufficient stability to avoid serious degradation under treatment conditions. Such materials include but are not limited to thermoplastic, thermosetting and elastomeric polymeric materials such as for example, polyolefins (e.g. polyethylenes, polypropylenes), vinylchloride polymers (e.g. polyvinylchloride), fluorine containing polymers, polyvinylacetate based polymers, acrylic based polymers, styrene based polymers (e.g. polystyrene), polyamides (e.g. nylons), polyacetals, polycarbonates, cellulose based plastics, polyesters, polyurethanes, phenolic and amino plastics, epoxy based resins, silicone and inorganic polymers, polysulphone based polymers, various natural based polymers and the like together with copolymers and blends of those materials with each other or with solvents or diluents or with different solid and liquid additives. Also, it is contemplated that chemically reactive materials such as materials or mixtures of materials which may form polymers which are viscous liquids at some stage of their formation, and at the temperatures maintained in the channel(s) may be fed to the machine for reaction and processing in the channel(s). Particularly contemplated are viscous materials and/or solutions and/or suspensions of viscous materials from which solvents or gases or other materials are to be removed or to which solvents, gases or other materials are to be added.

Temperature of the material as suplied and during the course of processing in the machine will be controlled so that the viscosities and flow characteristics of the material being processed are determinable.

The following Example is given as of assistance in understanding the invention and it is to be understood that the invention is not restricted to the particular procedures, proportions, materials, temperatures or other details of the process.

EXAMPLE

A processor as shown in FIG. 1 is set up with the elements angularly related, as shown in FIG. 7, that is with the inlet open 26 extending 15° in the direction of rotation of the rotor channel the spreader 34 disposed with its face spaced 10° in the direction of rotation from the edge of the inlet opening 26, the outlet opening 62 covering 10° prior to the channel end block 56 and the end block 56 covering 5° while $\theta_1$ represents the angle of the melt pool. The rotor 10 has an outside radius, $R_d$, of 7.5 in., and inside radius, $R_s$, of 3.0 in. The channel 20 is of wedge-shaped cross-section and has a channel gap width of 0.4 in. The inlet 26 to the housing of the processor is connected by a conduit to receive molten low-density polyethylene at a temperature of 400° F. and at the rate of 250 lbs./hr. It is required that the processor deliver the polyethylene after devolatilization at a pressure of 100 psi. An outlet port 46 disposed about midway of the length of the channel is provided for discharge of volatilized material from the free space in the channel. The spreader 34 is wedge-shaped complementary to the cross-section of the channel 20 and is adjustable inward and outward to control the space between its sides 36 and the walls 22 of the channel 20. Three separate trial runs are made with the spreader 34 spaced from the channel walls, 0.05 in., 0.100 in. and 0.125 in. to give three different film thicknesses of polyethylene on the walls of the channel. In calculating the channel rotor speed N, the density figure used for polyethylene is 50 lbs./cubic foot and the viscosity of the molten polyethylene is calculated from the equation:

$$\eta = m\dot{\gamma}^{n-1}$$

where $m = 2$ lb./sec$^{0.5}$/in$^2$. and $n = 0.5$.

From the channel rotor speed thus determined, the angular extent of the melt pool needed to develop the desired discharge pressure P of 100 psi is calculated by substituting the determined values in the equation given in the Tadmor application.

The following results are obtained:

| N RPM | $\delta$ (mils) | $\frac{(dP)}{(d\theta)}$ (psi/rad.) | Melt Pool Angle to generate 100 psi head pressure (degrees) | Fraction of circumference Available for devolatilization | Melt Residence Time in devolatilization (sec.) |
|---|---|---|---|---|---|
| 20 | 24 | 1218 | 4.7° | 0.876 | 2.6 |
| 10 | 48 | 771 | 7.4° | 0.868 | 5.2 |
| 5 | 97 | 391 | 14.6° | 0.840 | 10.1 |

The above data indicates that the required flow rate is obtained by depositing a film thickness of 24 mils on walls rotating at 20 rpm and a melt pool occupying about 4.7° is sufficient to generate the 100 psi for discharging the melt with a residence time of about 2.6 seconds for the processed material in the channel. Since the diffusion rate for removing volatiles drops quickly with time; lower residence times and thin films together with apparatus arranged to feed the material to a plurality of devolatilizing passages connected in series are definitely preferred operating conditions for the practicing of this invention.

From the description above, it should be apparent that the methods and apparatus disclosed presents to the art new and useful methods and apparatus which in terms of their efficiency, adaptability and versatility have unexpectedly improved performance characteristics over methods and apparatus known to the art at the time the invention was made.

I claim:

1. A method for processing liquid plastic or polymeric materials including the steps of:
   a. providing a processing zone defined by an annular processing passage comprising a channel having opposed rotatable walls providing a polymer processing surface area for the zone, a coaxial stationary enclosure surface cooperatively arranged with the channel to retain material in the passage, a feed point and a discharge point associated with the stationary surface, a liquid material blocking and collecting end wall surface providing member positioned adjacent the discharge point which is spaced apart from the feed point a major portion of the circumferential distance about the passage, a blocking and spreader surface providing member spaced apart from the end wall surface providing member by a major portion of the circumferential distance about the passage and port means communicating with a selected portion of the passage between the blocking and spreader surface and the end wall surface;
   b. rotating the opposed channel walls;
   c. introducing the liquid material at the feed point;
   d. blocking the advance of liquid material in the central portion of the channel at the blocking and spreader surface;
   e. spreading blocked material on the opposed rotating walls as thin layers so that the spread thin layers can be carried past the blocking and spreader surface providing member toward the end wall surface and provide a free central space in advance of the blocking and spreader surface providing member in the direction of rotation of the walls;
   f. adding material to or removing material from the thin layers through said port means;
   g. blocking advance of said thin layers and collecting blocked thin layer material at said blocking and collecting end wall surface for controlled processing and/or discharge from said processing zone; and,
   h. discharging said material from said processing zone to another processing zone as defined in step a for further processing at least according to steps b, c, d, e, f and g.

2. A method of claim 1 in which the rotational speed of the channel is coordinated with the cross-sectional area of the passage to provide a predetermined volumetric flow rate and also coordinated with the dragging action of the walls on the material of the pool to generate a predetermined discharge pressure and rate when the pool extends a predetermined circumferential distance back from the blocking and collecting end wall surface providing member.

3. A method of claim 1 in which material is removed from the thin layers.

4. A method of claim 1 in which material is added to the thin layers.

5. A method of claim 1 where at least another blocking and spreader surface providing member is positioned in said passage for blocking and spreading said material and so that separated free central spaces are provided in advance of each member in said zone in the direction of rotation of the walls.

6. A method of claim 5 where the blocking and spreader surface of each member are spaced apart by an angle of from about 90° to about 180°.

7. A method of claim 1 where the blocking and spreader surface of the member is positioned apart from the most upstream edge of the feed point by an angle of about 25° or less.

8. A method of claim 1 where the blocking and spreader surface of the member is positioned apart from the most upstream edge of the feed point by an angle of between about 5° to about 15°.

9. A method of claim 1 where the thickness of said thin layers spread on the opposed channel side walls are between about 0.001" to about 0.125".

10. A method of claim 1 where said opposed channel walls are rotated at speeds between about 10 to 100 RPM.

* * * * *